March 6, 1962 R. F. WELLNER 3,023,488
TEST PIN
Filed Dec. 24, 1958

INVENTOR.
RICHARD F. WELLNER
BY
ATTORNEYS ns # United States Patent Office 3,023,488
Patented Mar. 6, 1962

3,023,488
TEST PIN
Richard F. Wellner, Santa Monica, Calif., assignor, by mesne assignments, to Ampex Corporation, Redwood City, Calif., a corporation of California
Filed Dec. 24, 1958, Ser. No. 782,926
2 Claims. (Cl. 29—155.55)

This invention relates to the testing and sorting of toroidal magnetic cores and, more particularly, to an improvement in apparatus for testing these cores.

The magnetic toroidal ferrite core has been established as a basic element for use in memories employed in information-handling machines. A large number of these cores are employed for a memory, since each core is capable of storing only two bits of information. Prior to manufacturing a memory using these cores, it is necessary to test them to determine whether they have the required characteristics for the use intended. In view of the small dimensions of the toroidal core, special problems arise when handling and electrical testing in large quantities is tried.

Mass production techniques have been applied and testing machines have been manufactured, such as is illustrated in a patent to J. A. Rajchman, et al., No. 2,796,-986. Means are provided for aligning the cores so that they may be picked up one at a time on pins which extend from the periphery of a rotating wheel. The cores are carried by the pins past wiping contacts which apply test current and derive response voltages so that when the cores are thereafter carried past a removal station suitable apparatus for separating the cores into different classes, as indicated by the response results, is actuated.

To properly grade cores with an automatic core grader, it is necessary to make two electrical circuits through a core. These two circuits are usually referred to as the sense and drive circuits. An interaction between these two circuits should be at a minimum. There are three methods usually employed for making the two electrical circuits through a core. In the first method, a common pin, such as is ememplified in the patent cited, is employed, and the drive and sense currents share a common portion of the conductor. The advantage of the cheap cost of the pin is usually outweighed by the fact that unwanted oscillations and ground currents may be picked up in the sense circuit, causing erratic or faulty operation of the arrangement.

A second method for establishing two electrical circuits through a core is to employ a coaxial pin. This simply comprises a central conductor encased in an insulator which is in turn encased in a second conductor. The center conductor is made longer than the outer conductor, whereby wiping contacts can touch both ends of each conductor without interfering with each other. In view of the small diameter of the central aperture of the cores which are tested (these are on the order of 28 mils diameter), difficulty exists in producing a pin of the coaxial type with a maximum outer diameter of 20 mils, as is required. This difficulty is reflected in the high cost of a coaxial pin.

A third arrangement is to employ a split pin for providing the two electrical circuits through a magnetic core. The split pin is constructed by starting with a piece of wire with a 20-mil outer diameter which is milled down to form a length of wire with a cross-section shaped like a half moon ten mils in diameter. Two pieces of this prepared wire are then glued together with a piece of insulation between them to form a split pin sandwich. The disadvantage here lies not only in the high cost of producing such a pin, but in the fact that the pin does not last very long because of the tendency of the two conductors to spread apart at the tip, thus splitting the pin.

An object of this invention is to provide a test pin of the split pin type which is inexpensive to manufacture.

Another object of the present invention is to provide a wire which provides two isolated circuits and which occupies the space of a single wire.

Yet another object of the present invention is to provide a novel method and means of manufacturing a novel test pin for magnetic cores providing two separate circuits.

These and other objects of the invention are obtained by constructing a magnetic core test pin out of a piece of wire of a suitable length which is coated with an insulating coating. A longitudinal strip of this insulated coating is removed, exposing the wire underneath. A conductive coating is applied over a portion of the insulating coating which extends substantially the length of the wire except it is not permitted to extend sufficiently to touch the exposed wire. Thereby, a pin may be simply and inexpensively produced which contains two conductors separated by the high impedance of the insulating coating.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
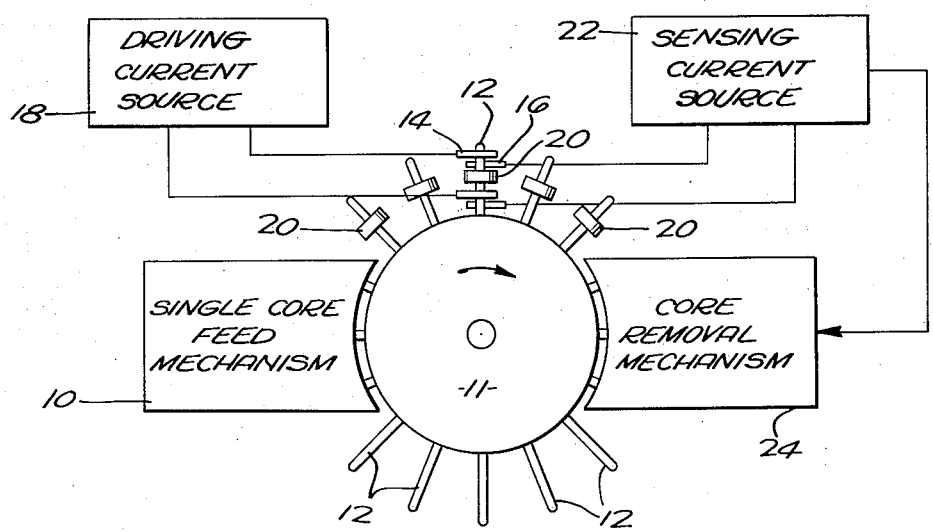
FIGURE 1 is a diagrammatic drawing of a magnetic-core test arrangement.

Referring now to FIGURE 1, a diagrammatic arrangement for testing magnetic cores may be seen. It usually includes a single core feed mechanism 10, which may have an arrangement such as the one illustrated in the patent to Rajchman et al., No. 2,796,986, for separating cores from a plurality thereof into a single-file arrangement so that one core at a time is held in position to be picked up by one of the pins 12. These pins 12 pick up the core from a single-core feed mechanism and carry it past sliding contacts 14, 16. Sliding contacts 14 are connected to a driving current source 18, which applies currents, in the form of pulse sequences of different numbers and amplitudes, to the pin 12 to excite the core 20, which has been picked up from the core feed mechanism. The sensing contact 16 detects the core performance by the current that flows through the pin in response to the induced voltages resulting from the drive applied to the core 20. The sensing current source 22 interprets this information and actuates the core removal mechanism 24 to remove the core when the pin is passed therethrough by means of the conveyor wheel 11, and deposited in a container containing other cores of similar test classification.

Figure 2:
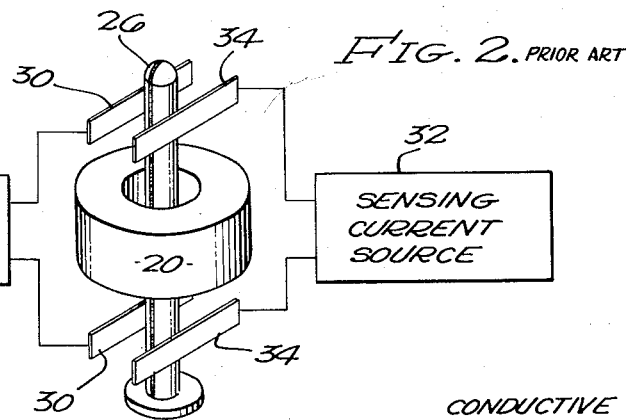
FIGURE 2 is an enlarged view of a single pin, in a magnetic-core test arrangement, holding a core.

FIGURE 2 shows a close-up of a pin 26, upon which a core 20 is mounted. The drive-current source 28 has a pair of sliding contacts 30, which make contact with one-half of the split pin 26 on either side of the core 20. The sensing circuit 32 has a pair of sliding contacts 34 which make contact with the other half of the split pin 26 on either side of the core 20. This arrangement is preferred electrically, since the driving and sensing circuits are isolated and chances of interaction between the two are thus minimized. However, as previously pointed out, the coaxial pin is an expensive item of manufacture, and the split pin, besides this, is easily destroyed if it has any misalignment which requires bending for its correction or if the pin strikes a core not having a hole, due to some error in the manufacture.

Figure 3:
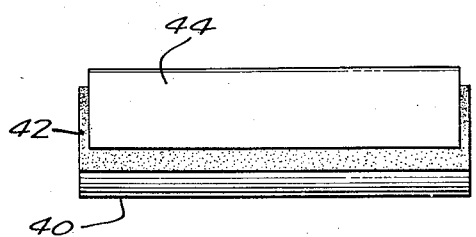
FIGURE 3 is a plan view of an embodiment of the invention.
Figure 4:
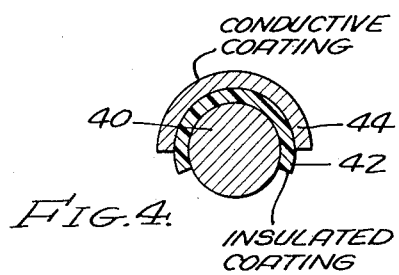
FIGURE 4 is a cross-sectional view of an embodiment of the invention.

FIGURES 3 and 4 are respectively plan and cross-sectional views of an embodiment of the invention. The test pin shown there includes a central conductor 40 of copper which is coated at first completely with any suitable insulation coating 42. Such coating may be, for example, of the type sold under the trade name "Quadformvar." This coating is then removed from a longitudinal strip of the periphery of the wire to expose the copper underneath. For example, an arc of approximately 120° may be exposed by scraping one side of the piece of wire.

Over a portion of the periphery of the wire covered by the remaining insulating coating 42 a conductive coating 44 is applied. This coating may be, for example, air drying silver paste. This coating is applied in a manner so that it will not run over the insulation coating and come in contact with the central conductor. As a result of the method of manufacture just described, when the silver paste is dry, a pin is produced which contains two conductors separated by the high impedance of the insulation coating. Furthermore, if the copper wire is used as the portion of the pin in the drive circuit, then the advantage of having a large cross-section of copper wire with low resistance is obtained.

The pin is sufficiently flexible to enable small bends to be easily made to correct for any misalignments of the pin holder and/or core pickup position without causing the pin to become useless for the desired purpose. Furthermore, the cost of the materials and the method of manufacture is considerably smaller than those of other forms of two conductor pins made heretofore. Should the silver paste wear off due to constant contact with the wipers employed in the test, it is both easy and inexpensive to plate the silver surface with a harder conductive metal.

It should be appreciated that in addition to a test pin the inventive concept shown herein has utility for purposes other than solely for a test pin. What is provided by this invention is a two-conductor wire occupying the space of one, which may be used where one of the conductors is required to carry substantial current and the other only a small current, or to evidence the presence of a voltage. This requirement exists where, for example, in a magnetic-core memory windings are employed for magnetizing the magnetic cores until they are saturated in one or the other of two states of magnetic polarity, depending on the binary data storage desired. There is also provided a sense or readout winding which may or may not have a small current induced therein whenever a readout of the data stored is desired. Such magnetic-core memories are well known and described, for example, by Jay W. Forrester in an article entitled, "Digital Information Storage in Three Dimensions Using Magnetic Cores," in the Journal of Applied Physics, 22, page 44, January 1951. In the winding arrangements for memories of this general type, known as word-selection memories, where the sense winding in a core plane and one of the driving windings, known as the digit-plane windings, pass through every core in the core plane, the two-conductor wire of the type described herein may be employed for providing both sense and digit plane windings. By a core plane is meant a plurality of magnetic cores arranged in columns and rows in a plane. A plurality of such core planes are employed for storing data, and a word is usually stored by having a single similarly positioned core in each core plane store a bit of the word.

Accordingly, there has been described and shown hereinabove a novel, useful, and inexpensive method and means for a wire of a two-conductor type adapted to be inserted in magnetic cores.

I claim:

1. A method of making a two-conductor pin for testing toroidal cores from a length of conductive wire having an insulating coating comprising removing said insulating coating from a longitudinal strip portion of the periphery of said wire to afford conductive connection to said wire, and applying a conductive coating over a desired area of the insulating coating remaining on said wire.

2. A method of making a two-conductor pin for testing toroidal cores from a length of conductive wire having an insulating coating comprising removing said insulating coating from a longitudinal strip portion of the periphery of said wire, and applying a coating of silver paste longitudinally along said remaining insulating coating on said wire.

References Cited in the file of this patent

UNITED STATES PATENTS

| | | |
|---|---|---|
| 531,406 | Bridgman | Dec. 25, 1894 |
| 1,207,359 | Aufiero | Dec. 5, 1916 |
| 2,232,222 | Flinn | Feb. 18, 1941 |
| 2,401,451 | Arey | Apr. 20, 1943 |
| 2,619,537 | Kihn | Nov. 25, 1952 |
| 2,911,333 | Capen et al. | Nov. 3, 1959 |

FOREIGN PATENTS

| | | |
|---|---|---|
| 935,014 | Germany | Nov. 10, 1955 |